(12) United States Patent
DeArment et al.

(10) Patent No.: US 11,943,319 B2
(45) Date of Patent: *Mar. 26, 2024

(54) SYSTEMS AND METHODS FOR ISOLATING APPLICATIONS ASSOCIATED WITH MULTIPLE TENANTS WITHIN A COMPUTING PLATFORM

(71) Applicant: Palantir Technologies Inc., Denver, CO (US)

(72) Inventors: Greg DeArment, Seattle, WA (US); Divyanshu Arora, Half Moon Bay, CA (US); Jason Hoch, New York, NY (US); Mark Elliot, London (GB); Matthew Williamson, London (GB); Robert Kruszewski, London (GB); Steven Austin, Rego Park, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/140,918

(22) Filed: Apr. 28, 2023

(65) Prior Publication Data

US 2023/0269307 A1  Aug. 24, 2023

Related U.S. Application Data

(63) Continuation of application No. 17/714,722, filed on Apr. 6, 2022, now Pat. No. 11,683,394, which is a
(Continued)

(51) Int. Cl.
*H04L 67/60* (2022.01)
*G06F 9/48* (2006.01)
*H04L 67/10* (2022.01)

(52) U.S. Cl.
CPC ............ *H04L 67/60* (2022.05); *G06F 9/4881* (2013.01); *H04L 67/10* (2013.01)

(58) Field of Classification Search
CPC ........ H04L 67/60; H04L 67/10; G06F 9/4881
See application file for complete search history.

(56) References Cited

U.S. PATENT DOCUMENTS 5,978,475 A   11/1999  Schneier et al.
6,253,203 B1   6/2001  O'Flaherty et al.
(Continued)

FOREIGN PATENT DOCUMENTS

CN   101729531   6/2010
CN   103281301   9/2013
(Continued)

OTHER PUBLICATIONS

European Patent Office; Official Communication for Application No. 19192652.6; dated Feb. 11, 2020.
(Continued)

*Primary Examiner* — Blake J Rubin
(74) *Attorney, Agent, or Firm* — Faegre Drinker Biddle & Reath LLP

(57) ABSTRACT

Systems and methods for isolating applications associated with multiple tenants within a computing platform receive a request from a client associated with a tenant for running an application on a computing platform. Hosts connected to the platform are associated with a network address and configured to run applications associated with multiple tenants. A host is identified based at least in part on the request. One or more broadcast domain(s) including the identified hosts are generated. The broadcast domains are isolated in the network at a data link layer. A unique tenant identification number corresponding to the tenant is assigned to the broadcast domains. In response to launching the application
(Continued)

on the host: the unique tenant identification number is assigned to the launched application and is added to the network address of the host; and the network address of the host is sent to the client associated with the tenant.

20 Claims, 6 Drawing Sheets

Related U.S. Application Data continuation of application No. 17/097,389, filed on Nov. 13, 2020, now Pat. No. 11,330,076, which is a continuation of application No. 16/545,073, filed on Aug. 20, 2019, now Pat. No. 10,868,887.

(60) Provisional application No. 62/803,257, filed on Feb. 8, 2019.

(56) References Cited

U.S. PATENT DOCUMENTS

| | | | |
|---|---|---|---|
| 6,725,240 B1 | 4/2004 | Asad et al. |
| 6,807,569 B1 | 10/2004 | Bhimani et al. |
| 7,017,046 B2 | 3/2006 | Doyle et al. |
| 7,069,586 B1 | 6/2006 | Winneg et al. |
| 7,225,468 B2 | 5/2007 | Waisman et al. |
| 7,596,285 B2 | 9/2009 | Brown et al. |
| 7,770,032 B2 | 8/2010 | Nesta et al. |
| 7,801,871 B2 | 9/2010 | Gosnell |
| 7,962,495 B2 | 6/2011 | Jain et al. |
| 8,141,036 B2 | 3/2012 | Wagner et al. |
| 8,181,253 B1 | 5/2012 | Zaitsev et al. |
| 8,190,893 B2 | 5/2012 | Benson et al. |
| 8,196,184 B2 | 6/2012 | Amirov et al. |
| 8,239,668 B1 | 8/2012 | Chen et al. |
| 8,301,904 B1 | 10/2012 | Gryaznov |
| 8,312,546 B2 | 11/2012 | Alme |
| 8,392,902 B2 | 3/2013 | Reinz |
| 8,646,080 B2 | 2/2014 | Williamson et al. |
| 8,667,456 B1 | 3/2014 | Czymontek |
| 8,683,322 B1 | 3/2014 | Cooper |
| 8,726,379 B1 | 5/2014 | Stiansen et al. |
| 8,769,412 B2 | 7/2014 | Gill et al. |
| 8,782,794 B2 | 7/2014 | Ramcharran |
| 8,931,043 B2 | 1/2015 | Cooper et al. |
| 9,021,260 B1 | 4/2015 | Falk et al. |
| 9,049,117 B1 | 6/2015 | Nucci et al. |
| 9,100,428 B1 | 8/2015 | Visbal |
| 9,122,562 B1 | 9/2015 | Stickle |
| 9,288,117 B1 | 3/2016 | Angrish et al. |
| 9,304,798 B2 | 4/2016 | Mudigonda et al. |
| 9,335,897 B2 | 5/2016 | Goldenberg |
| 9,338,013 B2 | 5/2016 | Castellucci et al. |
| 9,350,657 B2 | 5/2016 | Gross, IV et al. |
| 9,444,785 B2 | 9/2016 | Jungck et al. |
| 9,497,039 B2 | 11/2016 | Greenberg et al. |
| 9,509,662 B2 | 11/2016 | Mudigonda et al. |
| 9,514,327 B2 | 12/2016 | Ford |
| 9,721,117 B2 | 8/2017 | Pleau et al. |
| 9,754,122 B1 | 9/2017 | Christopher et al. |
| 9,813,303 B1 | 11/2017 | Guilli |
| 9,825,822 B1 | 11/2017 | Holland |
| 9,825,905 B2 | 11/2017 | Thakkar et al. |
| 9,900,313 B2 | 2/2018 | Wiest et al. |
| 10,009,443 B1 | 6/2018 | Guigli |
| 10,068,089 B1 | 9/2018 | Shavell et al. |
| 10,079,832 B1 | 9/2018 | DeArment et al. |
| 10,333,889 B2 | 6/2019 | Thakkar et al. |
| 10,348,767 B1 | 7/2019 | Lee et al. |
| 10,491,516 B2 | 11/2019 | Ram et al. |
| 10,691,493 B1 | 6/2020 | Barry et al. |
| 10,805,216 B2 | 10/2020 | Sinha et al. |
| 10,868,887 B2 | 12/2020 | DeArment et al. |
| 11,159,366 B1 | 10/2021 | Gawade et al. |
| 11,330,076 B2 | 5/2022 | DeArment et al. |
| 2002/0112157 A1 | 8/2002 | Doyle et al. |
| 2004/0073814 A1 | 4/2004 | Miyazaki et al. |
| 2004/0123139 A1 | 6/2004 | Aiello et al. |
| 2004/0153418 A1 | 8/2004 | Hanweck |
| 2004/0250124 A1 | 12/2004 | Chesla et al. |
| 2005/0157662 A1 | 7/2005 | Bingham et al. |
| 2005/0229256 A2 | 10/2005 | Banzhof |
| 2005/0262556 A1 | 11/2005 | Waisman et al. |
| 2005/0275638 A1 | 12/2005 | Kalmykov-Zotov et al. |
| 2006/0031928 A1 | 2/2006 | Conley et al. |
| 2006/0069912 A1 | 3/2006 | Zheng et al. |
| 2006/0179003 A1 | 8/2006 | Steele et al. |
| 2006/0121131 A1 | 9/2006 | Shull et al. |
| 2006/0218637 A1 | 9/2006 | Thomas et al. |
| 2006/0265747 A1 | 11/2006 | Judge |
| 2007/0074204 A1 | 3/2007 | Curtis et al. |
| 2007/0143851 A1 | 6/2007 | Nicodemus |
| 2007/0294766 A1 | 12/2007 | Mir et al. |
| 2008/0104407 A1 | 5/2008 | Horne et al. |
| 2008/0201580 A1 | 8/2008 | Savitzky et al. |
| 2008/0222706 A1 | 9/2008 | Renaud et al. |
| 2008/0229422 A1 | 9/2008 | Hudis et al. |
| 2009/0103442 A1 | 4/2009 | Douville |
| 2009/0228701 A1 | 9/2009 | Lin |
| 2009/0328222 A1 | 12/2009 | Helman et al. |
| 2010/0077481 A1 | 3/2010 | Polyakov et al. |
| 2010/0100963 A1 | 4/2010 | Maheffey |
| 2010/0103837 A1 | 4/2010 | Jungck et al. |
| 2010/0179831 A1 | 7/2010 | Brown et al. |
| 2010/0235915 A1 | 9/2010 | Memon et al. |
| 2010/0262688 A1 | 10/2010 | Hussain et al. |
| 2010/0309510 A1 | 12/2010 | Hansen |
| 2010/0325159 A1 | 12/2010 | Wright et al. |
| 2010/0330801 A1 | 12/2010 | Rouh |
| 2011/0060910 A1 | 3/2011 | Gormish et al. |
| 2011/0126127 A1 | 5/2011 | Mariotti et al. |
| 2011/0202555 A1 | 8/2011 | Cordover et al. |
| 2011/0219450 A1 | 9/2011 | McDougal et al. |
| 2011/0277027 A1 | 11/2011 | Hayton et al. |
| 2012/0079592 A1 | 3/2012 | Pandrangi |
| 2012/0084866 A1 | 4/2012 | Stolfo |
| 2012/0110055 A1 | 5/2012 | Van Biljon et al. |
| 2012/0110633 A1 | 5/2012 | An et al. |
| 2012/0110674 A1 | 5/2012 | Belani et al. |
| 2012/0120964 A1 | 5/2012 | Koponen et al. |
| 2012/0144023 A1 | 6/2012 | Guest et al. |
| 2012/0169593 A1 | 7/2012 | Mak et al. |
| 2012/0180039 A1 | 7/2012 | Bravery et al. |
| 2012/0218305 A1 | 8/2012 | Patterson et al. |
| 2012/0254129 A1 | 10/2012 | Wheeler et al. |
| 2012/0281706 A1 | 11/2012 | Agarwal et al. |
| 2012/0284791 A1 | 11/2012 | Miller et al. |
| 2012/0330801 A1 | 12/2012 | McDougal et al. |
| 2013/0019306 A1 | 1/2013 | Lagar-Cavilla et al. |
| 2013/0086322 A1 | 4/2013 | Pelletier et al. |
| 2013/0097709 A1 | 4/2013 | Basavapatna et al. |
| 2013/0110876 A1 | 5/2013 | Meijer et al. |
| 2013/0136123 A1 | 5/2013 | Ge et al. |
| 2013/0139268 A1 | 5/2013 | An et al. |
| 2013/0211911 A1 | 8/2013 | Krietzman |
| 2013/0239217 A1 | 9/2013 | Kindler et al. |
| 2013/0247142 A1 | 9/2013 | Nishizawa et al. |
| 2014/0013451 A1 | 1/2014 | Kulka et al. |
| 2014/0043972 A1 | 2/2014 | Li et al. |
| 2014/0059683 A1 | 2/2014 | Ashley |
| 2014/0098815 A1 | 4/2014 | Mishra et al. |
| 2014/0123279 A1 | 5/2014 | Bishop et al. |
| 2014/0129550 A1 | 5/2014 | Weatherhead et al. |
| 2014/0143009 A1 | 5/2014 | Brice et al. |
| 2014/0165038 A1 | 6/2014 | Kaler et al. |
| 2014/0173712 A1 | 6/2014 | Ferdinand |
| 2014/0173738 A1 | 6/2014 | Condry et al. |
| 2014/0188895 A1 | 7/2014 | Wang et al. |
| 2014/0204937 A1 | 7/2014 | Matsuoka |
| 2014/0229422 A1 | 8/2014 | Jain et al. |
| 2014/0280595 A1 | 9/2014 | Mani et al. |
| 2014/0283107 A1 | 9/2014 | Walton et al. |
| 2014/0366132 A1 | 12/2014 | Stiansen et al. |

(56) References Cited

U.S. PATENT DOCUMENTS

| | | |
|---|---|---|
| 2014/0373007 A1 | 12/2014 | Donnellan et al. |
| 2015/0006730 A1 | 1/2015 | Helfman et al. |
| 2015/0030024 A1 | 1/2015 | Venkataswami et al. |
| 2015/0039565 A1 | 2/2015 | Lucas |
| 2015/0063353 A1 | 3/2015 | Kapadia et al. |
| 2015/0082301 A1 | 3/2015 | Garg et al. |
| 2015/0106489 A1 | 4/2015 | Duggirala |
| 2015/0128274 A1 | 5/2015 | Giokas |
| 2015/0134600 A1 | 5/2015 | Eisner et al. |
| 2015/0163158 A1 | 6/2015 | Ryland |
| 2015/0188715 A1 | 7/2015 | Castelluci et al. |
| 2015/0195178 A1 | 7/2015 | Bhattacharya et al. |
| 2015/0200948 A1 | 7/2015 | Cairns et al. |
| 2015/0229664 A1 | 8/2015 | Hawthorn et al. |
| 2015/0248563 A1 | 9/2015 | Alfarano et al. |
| 2015/0261847 A1 | 9/2015 | Ducott et al. |
| 2015/0263970 A1 | 9/2015 | Macchiano et al. |
| 2015/0278311 A1 | 10/2015 | Isherwood et al. |
| 2015/0286665 A1 | 10/2015 | Nyman et al. |
| 2015/0312188 A1 | 10/2015 | White et al. |
| 2015/0326467 A1 | 11/2015 | Fullbright et al. |
| 2015/0326601 A1 | 11/2015 | Grandin et al. |
| 2015/0370549 A1 | 12/2015 | Zhang et al. |
| 2016/0004864 A1 | 1/2016 | Falk et al. |
| 2016/0013973 A1 | 1/2016 | Onoue |
| 2016/0020921 A1 | 1/2016 | Tsai et al. |
| 2016/0028759 A1 | 1/2016 | Visbal |
| 2016/0080502 A1 | 3/2016 | Yadav et al. |
| 2016/0087941 A1 | 3/2016 | Mudigonda et al. |
| 2016/0105392 A1 | 4/2016 | Thakkar et al. |
| 2016/0105393 A1 | 4/2016 | Thakkar et al. |
| 2016/0182309 A1 | 6/2016 | Maturana et al. |
| 2016/0182473 A1 | 6/2016 | Cignetti et al. |
| 2016/0188527 A1 | 6/2016 | Cherian et al. |
| 2016/0239343 A1 | 8/2016 | Holt |
| 2016/0253198 A1 | 9/2016 | Gallant et al. |
| 2016/0292236 A1 | 10/2016 | Joshi et al. |
| 2016/0344687 A1 | 11/2016 | Rong et al. |
| 2016/0352632 A1 | 12/2016 | Nedeltchev et al. |
| 2016/0371108 A1 | 12/2016 | Madtha et al. |
| 2017/0005923 A1 | 1/2017 | Babakian |
| 2017/0026245 A1 | 1/2017 | Rao et al. |
| 2017/0063542 A1 | 3/2017 | Vilella et al. |
| 2017/0091466 A1 | 3/2017 | Meyer et al. |
| 2017/0099160 A1 | 4/2017 | Mithyantha et al. |
| 2017/0185715 A9 | 6/2017 | Smith |
| 2017/0192986 A1 | 7/2017 | Isherwood et al. |
| 2017/0317972 A1 | 11/2017 | Bansal et al. |
| 2017/0323117 A1 | 11/2017 | Pleau et al. |
| 2017/0324660 A1 | 11/2017 | Sinha et al. |
| 2017/0331742 A1 | 11/2017 | He et al. |
| 2017/0331791 A1 | 11/2017 | Wardell et al. |
| 2017/0346686 A1 | 11/2017 | Mudigonda |
| 2017/0346736 A1 | 11/2017 | Chander et al. |
| 2017/0353444 A1 | 12/2017 | Karangutkar et al. |
| 2017/0373860 A1 | 12/2017 | Kshirsagar et al. |
| 2018/0024975 A1 | 1/2018 | Ramakrishnan et al. |
| 2018/0025152 A1 | 1/2018 | Ben Ali et al. |
| 2018/0069809 A1 | 3/2018 | Oswal et al. |
| 2018/0095774 A1 | 4/2018 | Atta et al. |
| 2018/0095898 A1 | 4/2018 | Khosravi et al. |
| 2018/0115470 A1 | 4/2018 | Huang et al. |
| 2018/0123903 A1 | 5/2018 | Holla et al. |
| 2018/0139150 A1 | 5/2018 | Jain et al. |
| 2018/0176176 A1 | 6/2018 | Kapur et al. |
| 2018/0219743 A1 | 8/2018 | Garcia et al. |
| 2018/0295036 A1 | 10/2018 | Krishnamurthy et al. |
| 2018/0332001 A1 | 11/2018 | Ferrero et al. |
| 2018/0351791 A1 | 12/2018 | Nagarajan et al. |
| 2018/0367393 A1 | 12/2018 | Harneja et al. |
| 2019/0052532 A1 | 2/2019 | Chen et al. |
| 2019/0068495 A1 | 2/2019 | Jeuk et al. |
| 2019/0097918 A1 | 3/2019 | Ponnuswamy et al. |
| 2019/0132229 A1 | 5/2019 | McCormack et al. |
| 2019/0141010 A1 | 5/2019 | Chander et al. |
| 2019/0334868 A1 | 10/2019 | Tewari et al. |
| 2020/0007583 A1 | 1/2020 | Dixit et al. |
| 2020/0067763 A1 | 2/2020 | Vytla |
| 2020/0136966 A1 | 4/2020 | Mishra |
| 2022/0232098 A1 | 7/2022 | DeArment et al. |

FOREIGN PATENT DOCUMENTS

| | | |
|---|---|---|
| EP | 1962222 | 8/2008 |
| EP | 2892197 | 7/2015 |
| EP | 2897051 | 7/2015 |
| EP | 2963578 | 1/2016 |
| EP | 2985974 | 2/2016 |
| EP | 3188069 | 7/2017 |
| EP | 3694173 B1 | 9/2022 |
| NL | 2011642 | 8/2015 |
| WO | WO 2005/010685 | 2/2005 |
| WO | WO 2017/177401 A1 | 10/2017 |

OTHER PUBLICATIONS

European Patent Office; Official Communication for Application No. 17197000.7; dated Mar. 8, 2018.

VirusTotal—About, <http://www.virustotal.com/en/about/> Printed Jun. 30, 2014 in 8 pages.

Schneier et al., "Automatic Event Stream Notarization Using Digital Signatures," Security Protocols, International Workshop Apr. 1996 Proceedings, Springer-Veriag, 1997.

Crosby et al., "Efficient Data Structures for Tamper-Evident Logging," Department of Computer Science, Rice University, 2009, pp. 17.

Ma et al., "A New Approach to Secure Logging," ACM Transactions on Storage, vol. 5, No. 1, Article 2, Published Mar. 2009, 21 pages.

Glaab et al., "EnrichNet: Network-Based Gene Set Enrichment Analysis," Bioinformatics 28.18 (2012): pp. i451-i457.

FireEye, <http://www.fireeye.com/> Printed Jun. 30, 2014 in 2 pages.

Lee et al., "A Data Mining and CIDF Based Approach for Detecting Novel and Distributed Intrusions," Lecture Notes in Computer Science, vol. 1907 Nov. 11, 2000, pp. 49-65.

Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.

FireEye—Products and Solutions Overview, <http://www.fireeye.com/products-and-solutions> Printed Jun. 30, 2014 in 3 pages.

Bhuyan et al., "Network Anomaly Detection: Methods, Systems and Tools," First Quarter 2014, IEEE.

Baker et al., "The Development of a Common Enumeration of Vulnerabilities and Exposures," Presented at the Second International Workshop on Recent Advances in Intrusion Detection, Sep. 7-9, 1999, pp. 35.

Hur et al., "SciMiner: web-based literature mining tool for target identification and functional enrichment analysis," Bioinformatics 25.6 (2009): pp. 838-840.

Waters et al., "Building an Encrypted and Searchable Audit Log," Published Jan. 9, 2004, 11 pages, http://www.parc.com/content/attachments/building_encrypted_searchable_5059_parc.pdf.

Zheng et al., "GOEAST: a web-based software toolkit for Gene Ontology enrichment analysis," Nucleic acids research 36.suppl 2 (2008): pp. W385-W363.

SYSTEMS AND METHODS FOR ISOLATING APPLICATIONS ASSOCIATED WITH MULTIPLE TENANTS WITHIN A COMPUTING PLATFORM

CROSS REFERENCE TO RELATED APPLICATIONS

This application is a continuation of U.S. application Ser. No. 17/714,722, filed Apr. 6, 2022, which is a continuation of U.S. application Ser. No. 17/097,389 (now U.S. Pat. No. 11,330,076), filed Nov. 13, 2020, which is a continuation of U.S. application Ser. No. 16/545,073 (now U.S. Pat. No. 10,868,887), filed Aug. 20, 2019, which claims priority to U.S. Provisional Application No. 62/803,257, filed Feb. 8, 2019, all incorporated by reference herein for all purposes.

BACKGROUND

Certain embodiments of the present invention are directed to computing platforms including hosts connected through a network. More particularly, some embodiments of the present invention provide systems and methods for isolating applications associated with multiple tenants within a computing platform.

With the number of customers of a computing platform increasing, the demands on data security provided by the computing platform are also increasing. In some examples, customers (e.g., tenants) are running multi-tenant applications on multiple hosts across the computing platform sharing resources and the network of the computing platform. Thus, managing network traffic and ensuring data security across a multi-tenant computing platform becomes increasingly more complex with the number of customers (e.g., tenants) increasing. For example, conventional computing platforms generally partition the network and hosts for running the applications on a per customer (e.g., per tenant) basis by using subnets and firewalls, which are difficult to implement and manage for an increased number of customers (e.g., tenants) of the platform.

Hence it is highly desirable to improve the techniques for isolating applications associated with multiple tenants within a computing platform.

SUMMARY

Certain embodiments of the present invention are directed to computing platforms including hosts connected through a network. More particularly, some embodiments of the present invention provide systems and methods for isolating applications associated with multiple tenants within a computing platform.

According to some embodiments, method for isolating applications associated with multiple tenants within a computing platform. For example, a method includes receiving a request from a client associated with a tenant for running an application on a computing platform. The computing platform includes a plurality of hosts connected through a network. Each host is associated with a network address and configured to run applications associated with multiple tenants. The method further includes identifying one or more hosts of the plurality of hosts based at least in part on the request. The method further includes generating one or more broadcast domains including the identified one or more hosts. The one or more broadcast domains are isolated in the network at a data link layer. The method further includes assigning to the one or more broadcast domains a unique tenant identification number corresponding to the tenant. The method further includes launching the application on at least one host of the identified one or more hosts. In response to launching the application on the at least one host: the unique tenant identification number is assigned to the launched application; the unique tenant identification number is added to the network address of the at least one host; and the network address of the at least one host is sent to the client associated with the tenant. The method is performed using one or more processors. The network address may further include a unique cluster identification number, the unique cluster identification number may be associated with a cluster of the computing platform; and the cluster may be associated with the tenant. The unique tenant identification number may include the unique cluster identification number. The network address may include a plurality of bit sequences; and one bit sequence of the plurality of bit sequences may include the unique tenant identification number. The plurality of bit sequences of the network address may include at least 128 bits. The broadcast domains may include virtual local area networks. The launched application may be included in a container; and the container may be associated with the unique tenant identification number. The container may be included in a pod running on the at least one host; the pod may include one or more containers; and each container of the one or more containers may be associated with one tenant of the computing platform. Each container of the one or more containers may be associated with a different tenant of the computing platform. The pod may map to the network address. The network address may further include a region identification number, a network device identification number, or a virtual interface of the at least one host. The one or more broadcast domain may map to the network address.

According to certain embodiments, a system for isolating applications associated with multiple tenants within a computing platform includes a plurality of hosts connected through a network and a fleet controller. Each host is associated with a network address and configured to run applications associated with multiple tenants on a computing platform. The fleet controller is configured to, in response to receiving a first request from a client associated with a tenant for running an application on the computing platform, identify one or more hosts of the plurality of hosts based at least in part on the request. The fleet controller is further configured to generate one or more broadcast domains including the identified one or more hosts. The one or more broadcast domains are isolated in the network at a data link layer. The fleet controller is further configured to assign to the one or more broadcast domains a unique tenant identification number corresponding to the tenant. The fleet controller is further configured to send a second request to a scheduler for launching the application on at least one host of the identified one or more hosts. The fleet controller is further configured to, in response to receiving confirmation from the scheduler of the application being launched on the at least one host: assign the unique tenant identification number to the launched application; add the unique tenant identification number to the network address of the at least one host; and send the network address of the at least one host to the client associated with the tenant. The network address may further include a unique cluster identification number; the unique cluster identification number may be associated with a cluster of the computing platform; and the cluster may be associated with the tenant. The network address may include a plurality of bit sequences; and one bit sequence of the plurality of bit sequences may include the unique tenant identification number. The plurality of bit sequences of the network address may include at least 128 bits. The broadcast domains may include virtual local area networks.

According to some embodiments, a system for isolating applications associated with multiple tenants within a computing platform includes a client associated with a tenant and configured to request running an application on a computing platform. The computing platform includes a plurality of hosts connected through a network. Each host is associated with a network address and is configured to run applications associated with multiple tenants. The client is further configured to send a request for running the application on the computing platform. The client is further configured to, in response to sending the request for running the application on the computing platform, receive the network address of at least one host of the plurality of hosts. One or more hosts of the plurality of hosts are identified based at least in part on the request. The identified one or more hosts include the at least one host. One or more broadcast domains are generated to include the identified one or more hosts. The one or more broadcast domains are isolated in the network at a data link layer. The one or more broadcast domains are assigned to a unique tenant identification number corresponding to the tenant. The application is launched on the at least one host of the identified one or more hosts. The launched application is assigned to the unique tenant identification number. The unique tenant identification number is added to the network address of the at least one host. The network address may further include a unique cluster identification number; the unique cluster identification number may be associated with a cluster of the computing platform; and the cluster may be associated with the tenant. The network address may include a plurality of bit sequences; and one bit sequence of the plurality of bit sequences may include the unique tenant identification number.

Depending upon embodiment, one or more benefits may be achieved. These benefits and various additional objects, features and advantages of the present invention can be fully appreciated with reference to the detailed description and accompanying drawings that follow.

DETAILED DESCRIPTION

Figure 1:
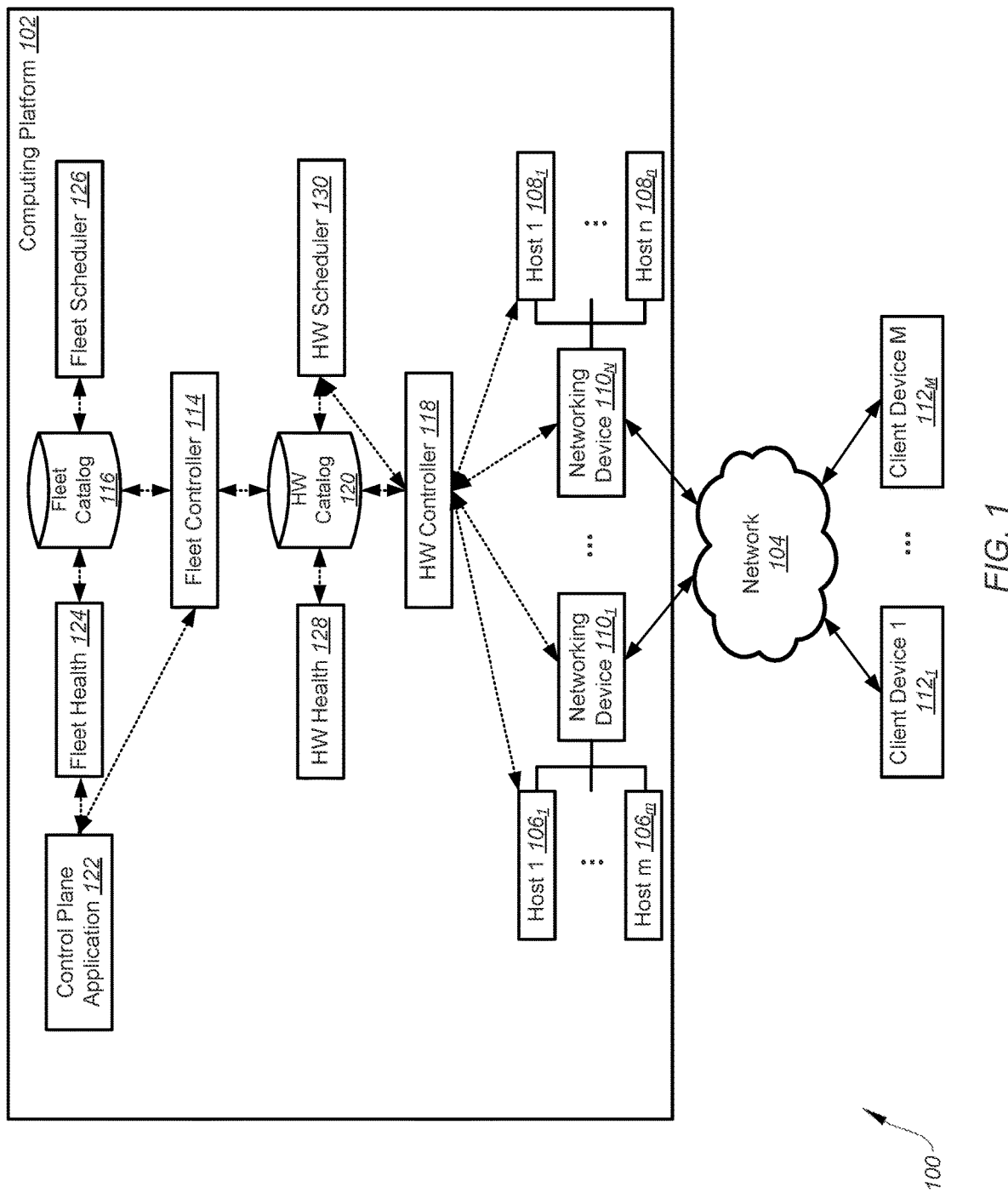
FIG. 1 is a simplified diagram showing a system for isolating applications associated with multiple tenants within a computing platform according to one embodiment of the present invention.

Conventional systems and methods are often not capable of efficiently isolating applications associated with multiple tenants within a multi-tenant computing platform. Conventional systems and methods typically partition the network of a computing platform and corresponding network addresses on a per customer (e.g., per tenant) basis by using subnets and firewalls. This increases the complexity and cost of managing applications in a multi-tenant environment across the platform and makes it difficult to scale the platform when the number of customers (e.g., the number of tenants) increases. For example, each customer is assigned its own subnets of network addresses and responsible for configuring and managing the assigned subnets. In turn, the use of subnets by conventional systems and methods requires the use of security groups around each subnet, including, for example, firewalls, to guarantee the security of customer data communicated across the platform.

In some embodiments, one or more solutions rooted in computer technology overcome one or more problems specifically arising in the realm of computer technology, including that of security of customer data. Some embodiments are directed to computing platforms including hosts connected through a network. More particularly, some embodiments of the present invention provide systems and methods for isolating applications associated with multiple tenants within a computing platform. In some examples, the hosts of the computing platform include virtual servers and/or virtual machines. In certain examples, the computing platforms include a virtual computing environment that provides an operating system and/or an application server for running one or more containers. For example, a container includes a containerized application. In some examples, one or more containers run on a server or host machine of the computing platform and are associated with particular resources that include CPU, memory, storage, and/or networking capacity. In certain examples, the hosts of the computing platform include physical servers and/or physical machines.

In certain embodiments, systems and methods are configured to isolate applications (e.g., containers) on a per tenant and per host basis by assigning to each application (e.g., each container) a unique tenant identification number corresponding to a particular tenant of the computing platform and embedding the unique tenant identification number in a network address of a host running the application (e.g., container). In some examples, the systems and methods are further configured to isolate applications (e.g., containers) associated with different tenants at the data link layer by generating a broadcast domain including the host, assign the broadcast domain to the unique tenant identification number, and run the applications (e.g., the containers) associated with the unique tenant identification number in the broadcast domain of the host. In certain examples, the broadcast domain associated with the unique tenant identification number is mapped to the network address including the unique tenant identification number.

According to some embodiments, benefits include significant improvements, including, for example, increased efficiency, reduced complexity, and improved scalability, in managing an increased number of tenants across a multi-tenant computing platform. In certain embodiments, other benefits include increased data security for each tenant on a multi-tenant computing platform. In some embodiments, systems and methods are configured to isolate application data from different tenants across a multi-tenant computing platform.

FIG. 1 is a simplified diagram showing a system 100 for isolating applications associated with multiple tenants within a computing platform 102 according to one embodiment of the present invention. This diagram is merely an example, which should not unduly limit the scope of the claims. One of ordinary skill in the art would recognize many variations, alternatives, and modifications. The system 100 includes the computing platform 102 and a network 104. In some examples, the computing platform 102 includes a plurality of hosts. For example, the plurality of hosts includes hosts $106_{1-m}$, $108_{1-n}$. As an example, hosts $106_{1-m}$ represents hosts $106_1, \ldots, 106_m$ as shown in FIG. 1, and hosts $108_{1-n}$ represents hosts $108_1, \ldots, 108_n$ as shown in FIG. 1. As an example, each host of the hosts $106_{1-m}$, $108_{1-n}$ is configured to be connected to other components of the computing platform 102 through the network 104. As an example, each host of the hosts $106_{1-m}$, $108_{1-n}$ is associated with a network address. In one example, each host of the hosts $106_{1-m}$, $108_{1-n}$ is configured to run applications associated with multiple tenants. In certain examples, the computing platform 102 includes one or more networking devices $110_{1-N}$. For example, networking devices $110_{1-N}$ represents networking devices $110_1, \ldots, 110_N$ as shown in FIG. 1. As an example, each networking device of the one or more networking devices $110_{1-N}$ is configured to be connected through the network 104. In one example, each host of the hosts $106_{1-m}$, $108_{1-n}$ is configured to be connected to one or more networking devices $110_{1-N}$ through the network 104. In certain examples, the network 104 includes at least three networking layers (e.g., a physical layer or layer 1, a data link layer or layer 2, and a network layer or layer 3). For example, the network 104 includes an IPv4 network, an IPv6 network, or any combination thereof. In some examples, the computing platform 102 includes a plurality of racks. For example, each rack of the plurality of racks includes one or more hosts and one or more networking devices. As an example, the computing platform 102 includes N racks with the first rack including the networking device $110_1$ and the hosts $106_{1-m}, \ldots,$ and the Nth rack including the networking device $110_N$ and the hosts $108_{1-n}$. In certain examples, the networking devices $110_{1-N}$ of the racks include top-of-rack (ToR) switches.

In some embodiments, the computing platform 102 includes a cluster computing platform including clusters of one or more server or host machines (e.g. one or more hosts of the hosts $106_{1-m}$, $108_{1-n}$). In some examples, the computing platform 102 includes a distributed computing platform that allows the one or more client devices $110_{1-M}$ to distribute applications and/or data over the network 104 to the cluster of servers or host machines (e.g. clusters of the hosts $106_{1-m}$, $108_{1-n}$). For example, client devices $110_{1-M}$ represents client devices $112_1, \ldots, 112_M$ as shown in FIG. 1. In certain examples, the computing platform 102 includes a cloud computing platform that allows the one or more client devices $112_{1-M}$ access to remote servers, data storages, networks, devices, applications and/or data resources over the network 104. For example, multiple customers (e.g., multiple tenants) through the one or more client devices $112_{1-M}$ store data at the data storages of the cloud computing platform. In other examples, the computing platform 102 is associated with a platform provider that provides the platform to multiple customers (e.g., multiple tenants). For example, customers (e.g., tenants) of the computing platform 102 include individuals, organizations and/or commercial companies.

In certain embodiments, the one or more servers or host machines (e.g., the one or more hosts of the hosts $106_{1-m}$, $108_{1-n}$) are divided into in one or more regions. For example, a region represents a geographic area that the one or more servers or host machines are located within. As an example, each region relates to a different geographic area. In other examples, each region of the one or more servers or host machines includes one or more separate zones. For example, each server or host machine within a region is associated with only one zone of the one or more separate zones associated with the region. As an example, each zone within a region is isolated from any other zone within the region. In one example, each zone within a region is connected with any other zone within the region through low-latency links. In some examples, the computing platform 102 is configured to not replicate applications and/or resources across different regions. For example, each region is completely independent from any other region of the computing platform 102.

According to some embodiments, the computing platform 102 includes a container-orchestration platform. In some examples, the container-orchestration platform allows for automated deployment, scaling and/or operations of containers across the platform. For example, the container-orchestration platform employs the containers across the one or more servers or host machines (e.g., one or more hosts of the hosts $106_{1-m}$, $108_{1-n}$) of the computing platform 102. In some examples, a pod of the computing platform 102 represents a basic scheduling unit of work on the computing platform 102. In certain examples, the pod includes one or more containers. In other examples, one or more pods of the computing platform 102 provide a service to the one or more client devices $112_{1-M}$.

According to certain embodiments, a container of the computing platform 102 includes one or more applications. In some examples, the container also includes data and libraries associated with the one or more applications. For example, the container allows the one and more applications and their associated data and libraries to be co-located on the same server or host machine (e.g., the same host of the hosts $106_{1-m}$, $108_{1-n}$). In one example, the container allows the one or more applications and their associated data and libraries to share resources. For example, the shared resources include CPU, memory, storage, and/or networking capacity. As an example, the container represents the lowest level of a micro-service of the computing platform 102. In one example, the micro-service includes the one or more applications, libraries and the applications' dependencies.

In some embodiments, the computing platform 102 includes a fleet controller 114. In some examples, the computing platform 102 includes a fleet catalog 116, a hardware (HW) controller 118, a hardware catalog 120, a control plane application 122, a fleet health component 124, a fleet scheduler 126, a hardware health component 128, and a hardware scheduler 130. For example, the control plane application 122 is configured to schedule and manage applications that run on the hosts $106_{1-m}$, $108_{1-n}$. As an example, the control plane application 122 is configured to manage regions, tenants and node (e.g., host) assignments of the computing platform 102. In certain examples, the control plane application 122 is configured to manage workloads and communications between applications running on the hosts $106_{1-m}$, $108_{1-n}$.

In certain embodiments, the computing platform 102 is configured to provide services to tenants based at least in part on two abstract layers including a fleet layer and a hardware layer. In some examples, the fleet layer includes logical states and entities of components of the computing platform 102. For example, logical entities include a logical entity associated with a cluster of 64 nodes (e.g., hosts). In one example, logical entities include a logical entity associated with three publicly routable IP addresses. As an example, the hardware layer includes actual physical components and resources (e.g., hardware components) of the computing platform 102. In other examples, the organization of the two abstract levels of computing platform 102 is symmetrical with respect to the services provided by the computing platform. In some examples, the fleet catalog 116 and the hardware catalog 120 store data and sources of truth relating to the state of the two abstract layers, respectively. In some examples, the fleet controller 114 is configured to actuate an actual logical state of the computing platform 102 that matches a desired logical state stored in the fleet catalog 116. In certain examples, the hardware controller 118 is configured to actuate a physical state of the computing platform 102 that matches a desired physical state stored in the hardware catalog 120. For example, the actual logical state represents a state that corresponds to the actual physical state of the computing platform 102.

According to some embodiments, the fleet controller 114 is configured to receive a request from a client (e.g., a client device) associated with a tenant for running an application on the computing platform 102. For example, each client device of the client devices $110_{1-M}$ is associated with a different customer (e.g., a different tenant) of the multi-tenant computing platform 102. In some examples, the fleet controller 114 is configured to send the received request for storing to the fleet catalog 116. In certain examples, the fleet controller 114 is configured to queue requests received from the client devices $112_{1-M}$ and/or other components of the computing platform 102. For example, the fleet controller 114 is configured to provide a control loop for ensuring that a declared logical state in the fleet catalog 116 is satisfied. In certain examples, the fleet catalog 116 is configured to provide a source of truth for states of resources of the computing platform 102. As an example, states of resources include logical assignment of the hosts $106_{1-m}$, $108_{1-n}$ and their status. For example, the fleet catalog 116 provides information that associates a tenant with a cluster of the computing platform 102.

According to certain embodiments, the fleet controller 114 is configured to monitor changes and/or updates of the states of resources included in the fleet catalog 116. For example, the fleet controller 114 is configured to retrieve a declared state of a resource from the fleet catalog 116. In some examples, the fleet controller 114 is configured to query the hardware catalog 120 for available hardware components of the computing platform 102. For example, the hardware catalog 120 is configured to provide a source of truth for the hardware components of the computing platform 102 and its state. As an example, states of hardware components of the computing platform 102 include host serial numbers, rack locators, ports, MAC addresses, internet protocol (IP) addresses, host images, host health, and power status of hardware components of the computing platform 102.

In some embodiments, the fleet controller 114 is configured to allocate and assign hardware components (e.g., physical machines and/or hosts $106_{1-m}$, $108_{1-n}$) to tenants and/or clusters of the computing platform 102. For example, the fleet controller 114 is configured to, in response to successful allocating the hardware components of the computing platform 102, update the hardware catalog 120 to reflect the allocation of the hardware components. As an example, the fleet controller 114 is configured to send reservations for hardware components to the hardware controller 118. In one example, the fleet controller 114 is configured to map allocated compute nodes (e.g., hosts) to clusters of the computing platform 102. For example, a certificate residing on a compute node (e.g., a host) includes information that associates the compute node with a cluster of the computing platform 102.

In certain embodiments, the hardware controller 118 is configured to monitor state changes in the hardware catalog 120. In certain examples, the hardware controller 118 is configured to, in response to determining state changes in the hardware catalog 120, actuate the changes in the corresponding hardware components of the computing platform 102. For example, state changes include assignments and/or reservations added by the fleet controller 114 to the hardware catalog 120. As an example, the hardware controller 118 is configured to provide a control loop for ensuring that a declared hardware state in the hardware catalog 120 is satisfied.

According to some embodiments, the hardware controller 118 is configured to, in response to the fleet controller 114 assigning the hardware components (e.g., the physical machines and/or the hosts $106_{1-m}$, $108_{1-n}$) to tenants and/or clusters of the computing platform 102, configure and/or connect the corresponding hardware components. For example, the hardware controller 118 is configured to provide IP addresses to the hardware components and connect the ToR switches, network interface controllers (NICs) and other components of the computing platform 102 to the hardware components. In some examples, the hardware controller 118 is configured to assign IP addresses on a per cluster basis. In certain examples, the hardware controller 118 is configured to read the hardware catalog 120 for reservations of compute nodes (e.g., hosts) of the computing platform 102. For example, the hardware controller 118 is configured to communicate to a networking device connected to one or more reserved compute nodes (e.g., hosts) a request for network addresses to be assigned to the one or more reserved compute nodes. As an example, the networking device is configured to, in response to receiving the request, allocate the network addresses and assign the allocated network addresses to the one or more reserved compute nodes (e.g., hosts) connected to the networking device.

According to certain embodiments, the hardware catalog 120 is configured to store information associated with the allocated network addresses of the one or more reserved compute notes (e.g., hosts), the networking device connected to the one or more reserved compute nodes, and/or the clusters associated with the one or more reserved compute nodes. In some examples, the hardware catalog 120 is configured to provide the actual hardware configuration of the computing platform 102 and record changes in the hardware configuration relating to the employment of physical servers and association of services and servers with certain customers (e.g., tenants). For example, the hardware catalog 120 is configured to provide information associated with mapping allocated compute nodes (e.g., allocated hosts) to clusters of the computing platform 102.

In some embodiments, the fleet scheduler 126 is configured to identify one or more hosts of the hosts $106_{1-m}$, $108_{1-n}$ based at least in part on the request for resources by querying the fleet catalog 116 and/or the hardware catalog 120. In some examples, the hardware scheduler 130 is configured to determine a time when hardware components (e.g., physical machines and/or resources) are made available to the hardware controller 118 for employment to satisfy a declared state in the hardware catalog 120. In some examples, the fleet health component 124 is configured to poll services running on hosts and/or other components of the computing platform 102 based at least in part on entries in the fleet catalog 116. For example, the fleet health component 124, in response to receiving results from the queried services, logs the health and state of the declared resource in the fleet catalog 116. In certain examples, the fleet health component 124 is configured to generate a custom logic for polling services regarding different types of resources. For examples, types of resources include non-public types (e.g., resources of billing and logging components). In other examples, the hardware health component 128 is configured to update the hardware catalog 120 regarding the health and the state of hardware components of one or more regions of the computing platform. For example, the health includes information about the hardware components being operational, allocated and/or ready to operate. In some examples, the hardware health component 128 is configured to poll components of the computing platform 102 regarding their health and/or state. As an example, the hardware health component 128 is configured to push hardware changes and/or updates in the hardware catalog 120 to components of the computing platform 102 based at least in part on features supported by hardware standards implemented on the computing platform.

In certain embodiments, the fleet controller 114 is configured to read the fleet catalog 116 to determine changes in the state of resources requested by tenants of the multi-tenant computing platform 102. For example, the fleet catalog 116 includes a request by a tenant for a cluster of 64 hosts in two zones. In some examples, the fleet controller 114 is configured to, in response to determining changes in the state of resources requested by tenants, request the fleet scheduler 126 for scheduling the requested resources. In certain examples, the fleet scheduler 126 is configured to query the fleet catalog 116 in response to receiving a request for resources from the fleet controller 114. For example, the fleet scheduler 126 is configured to send a reply to the fleet controller 114 in response to querying the fleet catalog 116. As an example, the reply includes a determination whether all the requested resources or a percentage of the requested resources are available for employment.

Figure 2:
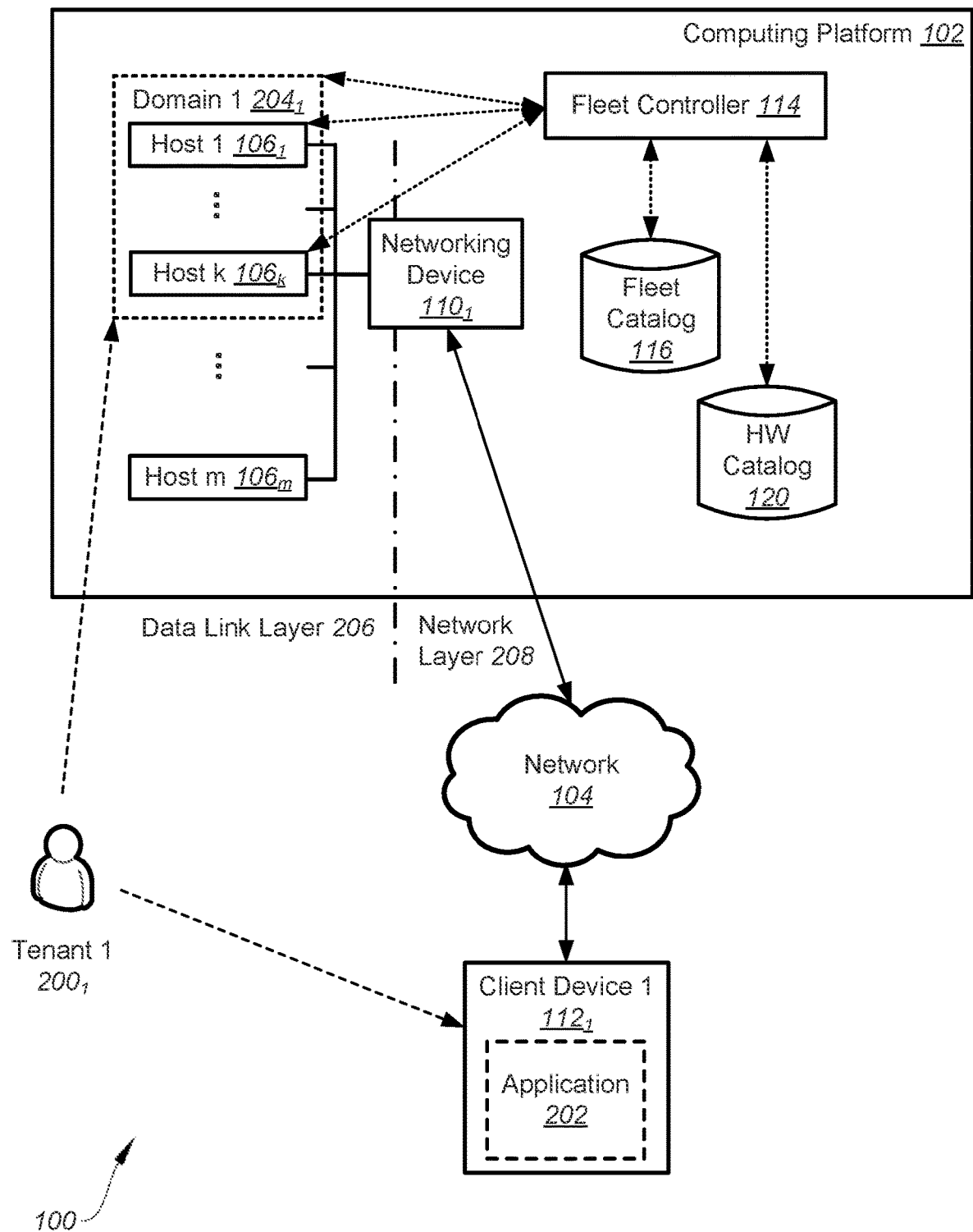
FIG. 2 is a simplified diagram showing the system for isolating applications associated with multiple tenants within the computing platform as shown in FIG. 1 according to one embodiment of the present invention.

FIG. 2 is a simplified diagram showing the system 100 for isolating applications associated with multiple tenants within the computing platform 102 according to one embodiment of the present invention. This diagram is merely an example, which should not unduly limit the scope of the claims. One of ordinary skill in the art would recognize many variations, alternatives, and modifications. In some examples, the fleet controller 114 is configured to receive a request from the client (e.g., the client device $112_1$) associated with tenant $200_1$ for running the application 202 on the computing platform 102. In certain examples, the fleet controller 114 is configured to identify one or more hosts $106_1, \ldots 106_k$ of the plurality of hosts (e.g., the hosts $106_{1-m}$) based at least in part on the request. For example, the fleet controller 114 is configured to store information associated with the identified hosts $106_1, \ldots 106_k$ in the fleet catalog 116 and/or hardware catalog 120 for recording the state changes of the identified hosts $106_1, \ldots 106_k$. In some examples, the network 104 includes one or more broadcast domains of the computing platform 102. For example, broadcast domains are isolated from other broadcast domains at the data link layer of the network 104. In one example, each broadcast domain includes different hosts of the computing platform 102. In certain examples, the broadcast domains are associated with different tenants of the multi-tenant computing platform 102. For example, each broadcast domain is associated with one tenant. As an example, the one tenant associated with a broadcast domain is different from tenants associated with the other broadcast domains. In some examples, the broadcast domains include virtual local area networks (VLANs).

In some embodiments, the fleet controller 114 is configured to generate the broadcast domain $204_1$ including the identified one or more hosts $106_1, \ldots 106_k$. For example, the fleet controller 114 is configured to store information associated with the broadcast domain $204_1$ in the fleet catalog 116 and/or hardware catalog 120. In some examples, the broadcast domain $204_1$ is isolated from other broadcast domains in the network 104 at a data link layer 206. In certain examples, the networking device $110_1$ is connected to other platform components at a network layer 208 of the computing platform 102. In other examples, the broadcast domain $204_1$ includes a unique domain identification number (e.g., "1").

In certain embodiments, the fleet controller 114 is configured to assign to the broadcast domain $204_1$ a unique tenant identification number (e.g., "1") corresponding to tenant $200_1$. For example, the fleet controller 114 is configured to store information associated with the unique tenant identification number (e.g., "1") and the assigned broadcast domain $204_1$ in the fleet catalog 116. In some examples, the unique tenant identification number (e.g., "1") corresponds to the unique domain identification number (e.g., "1") associated with the broadcast domain $204_1$. For example, the unique tenant identification number includes a bit sequence with a first portion of the bit sequence representing the unique domain identification number. In other examples, the unique tenant identification number (e.g., "1") represents a route identification number. As an example, a second portion of the bit sequence of unique tenant identification number represents the route identification number.

According to some embodiments, the fleet controller 114 is configured to launch the application 202 on at least one host of the identified hosts $106_1, \ldots 106_k$. For example, the fleet controller 114 is configured to store information associated with the at least one host in the fleet catalog 116 and/or hardware catalog 120 for recording the state change of the at least one host.

According to certain embodiments, the fleet controller 114 is configured to, in response to launching the application 202 on the at least one host, assign the unique tenant identification number (e.g., "1") to the launched application. In some examples, the launched application is included in a container associated with tenant $200_1$. In certain examples, the fleet controller 114 is configured to add the unique tenant identification (e.g., "1") to the network address of the at least one host.

In some embodiments, the network addresses of the hosts $106_{1-m}$ include unique tenant identification numbers associated with one or more tenants of the multi-tenant computing platform 102. In some examples, the unique tenant identification numbers relate to unique cluster identification numbers. For example, each network address includes a unique cluster identification numbers associated with a cluster of hosts of the computing platform 102. As an example, each unique tenant identification number represents the unique cluster identification number. In certain examples, the unique cluster identification number is associated with one or more tenants of the multi-tenant computing platform 102.

In certain embodiments, each network address of the hosts $106_{1-m}$ includes a region identification number, a rack identification number (e.g., a network device identification number), and/or a virtual interface of the corresponding host associated with the network address. In some examples, each network address includes an IPv6 address. In certain examples, each network address includes a predetermined network prefix. For example, the predetermined network prefix includes a /16 network prefix or a /28 network prefix. As an example, the predetermined network prefix is associated with a region of the computing platform 102. In other examples, the predetermined network prefix associated with a region of the computing platform 102 represents the region identification number. In some examples, the network addresses include a bit sequence corresponding to subnets associated with the networking devices and/or the hosts of the computing platform 102. For example, the bit sequence corresponds to 16-bit subnets associated with racks of the computing platform 102.

According to some embodiments, the network addresses of the hosts $106_{1-m}$ include a bit sequence associated with the unique tenant identification number. For example, each network address includes a 20-bit sequence or a 32-bit sequence of the network address for embedding the unique tenant identification number. As an example, each pod running on the hosts $106_{1-m}$ is configured to use the bit sequence to identify the tenant associated with the unique tenant identification number. In some examples, each network address includes a bit sequence used to identify the virtual interface of the corresponding host for a particular tenant and for a particular networking device (e.g., a particular rack). For example, the bit sequence includes a 64-bit sequence. As an example, the bit sequence is configured to be used for assigning IP addresses of the host's virtual interface, which are generated, for example, by stateless address autoconfiguration (SLAAC).

According to certain embodiments, the fleet controller 114 is configured to send the network address of the at least one host of the identified one or more hosts $106_1, \ldots 106_k$ to the client (e.g., the client device $112_1$) associated with tenant $200_1$.

Figure 3:
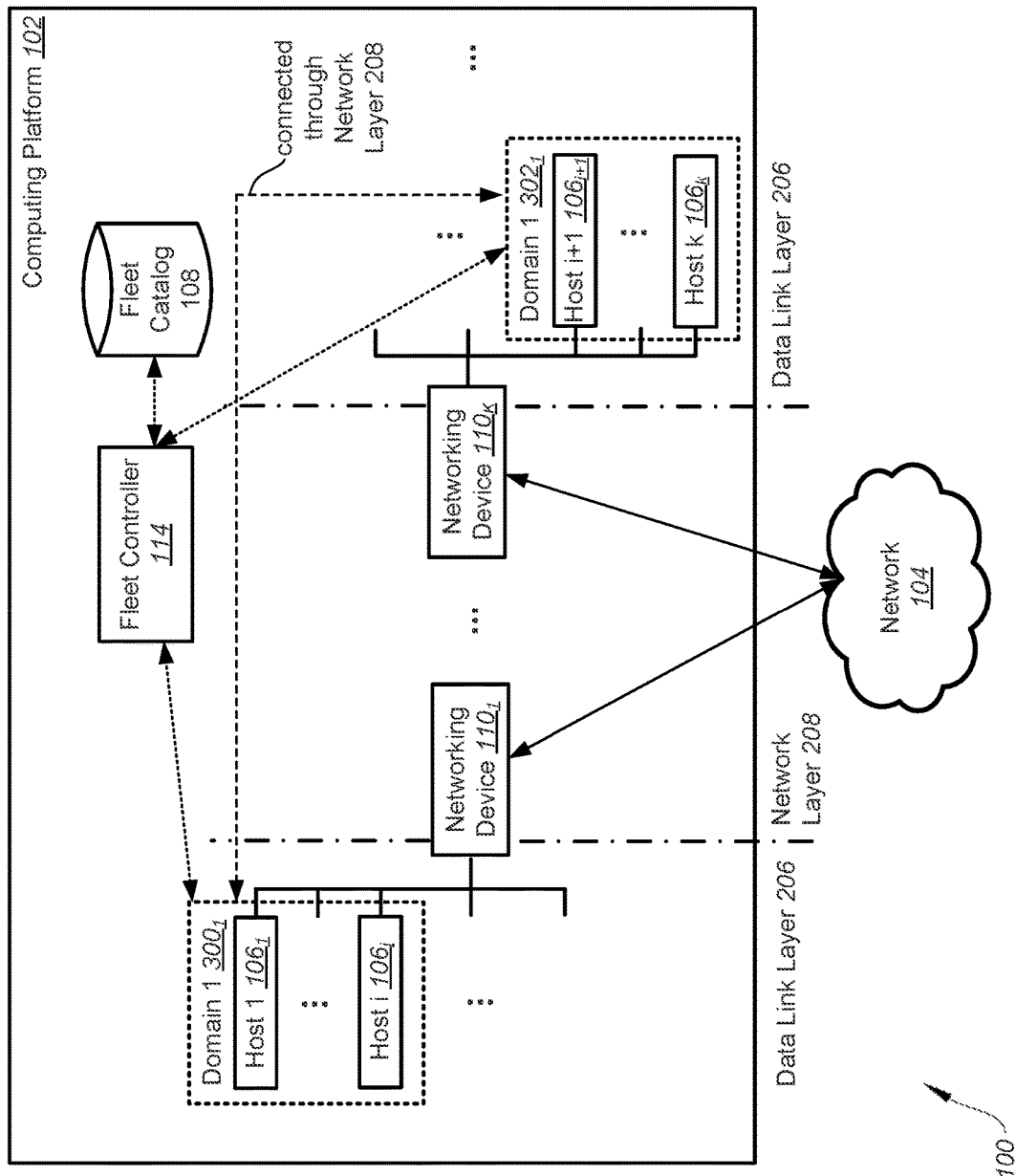
FIG. 3 is a simplified diagram showing the system for isolating applications associated with multiple tenants within the computing platform as shown in FIG. 1 according to one embodiment of the present invention.

FIG. 3 is a simplified diagram showing the system 100 for isolating applications associated with multiple tenants within the computing platform 102 according to one embodiment of the present invention. This diagram is merely an example, which should not unduly limit the scope of the claims. One of ordinary skill in the art would recognize many variations, alternatives, and modifications. In some examples, the fleet controller 114 is configured to generate the broadcast domains $300_1$ and $302_1$ including the identified hosts $106_1, \ldots, 106_i, 106_{i+1}, \ldots, 106_k$. For example, the broadcast domain $300_1$ includes the hosts $106_1, \ldots, 106_i$, and the broadcast domain $302_1$ includes the hosts $106_{i+1}, \ldots, 106_k$. As an example, the fleet controller 114 is configured to store information associated with the broadcast domains $300_1$ and $302_1$ in the fleet catalog 116 and/or hardware catalog 120.

In some embodiments, the broadcast domains $300_1$ and $302_1$ are connected through the network layer 208 of the network 104. In some examples, the broadcast domains $300_1$ and $302_1$ are associated with one or more tenants of the computing platform 102. In some examples, the broadcast domains $300_1$ and $302_1$ are associated with the same tenant of the computing platform 102. In other examples, the broadcast domain $300_1$ is connected to the networking device $110_1$ at the data link layer of the network 104. In some examples, the broadcast domain $302_1$ is connected to the networking device $110_K$ at the data link layer of the network 104. In certain examples, the networking device $110_1$ is configured to send data frames from the broadcast domains $300_1$ to the broadcast domain $302_1$ using the network layer 208 of the network 104.

In certain embodiments, the fleet controller 114 is configured to assign to the broadcast domains $300_1$ and $302_1$ a unique tenant identification number corresponding to one tenant of the multi-tenant computing platform 102. For example, the fleet controller 114 is configured to store information associated with the unique tenant identification number and the assigned broadcast domains $300_1$ and $302_1$ in the fleet catalog 116. As an example, the broadcast domains $300_1$ and $302_1$ are associated with the same tenant. In some examples, the unique tenant identification number corresponds with the unique domain identification numbers (e.g., "1") associated with the broadcast domains $300_1$ and $302_1$. For example, the unique tenant identification number includes a bit sequence with a first portion of the bit sequence representing the unique domain identification number associated with the broadcast domains $300_1$ and $302_1$. In certain examples, the broadcast domains $300_1$ and $302_1$ include a virtual local area network (VLAN) extending over the network 104 through the network layer 208.

According to some embodiments, networking devices of the computing platform 102 are configured to provide, at the data link layer 206 of the network 104, layer 2 isolation on a per-tenant basis by assigning each tenant to a separate VLAN. For example, networking devices $110_1, \ldots, 110_K$ (e.g., ToR ports) of the network 104 that are connecting down to the compute nodes (e.g., the hosts) include 802.1q trunks for carrying multiple VLANs. As an example, each compute node (e.g., each host) includes at least two VLANs with one VLAN for the control plane application and the other VLAN for the container associated with the primary tenant running on the compute node (e.g., the host). In some examples, the networking devices $110_1$ and $110_K$ are configured to tag received network data for sending across broadcast domains of the computing platform 102.

Figure 4:
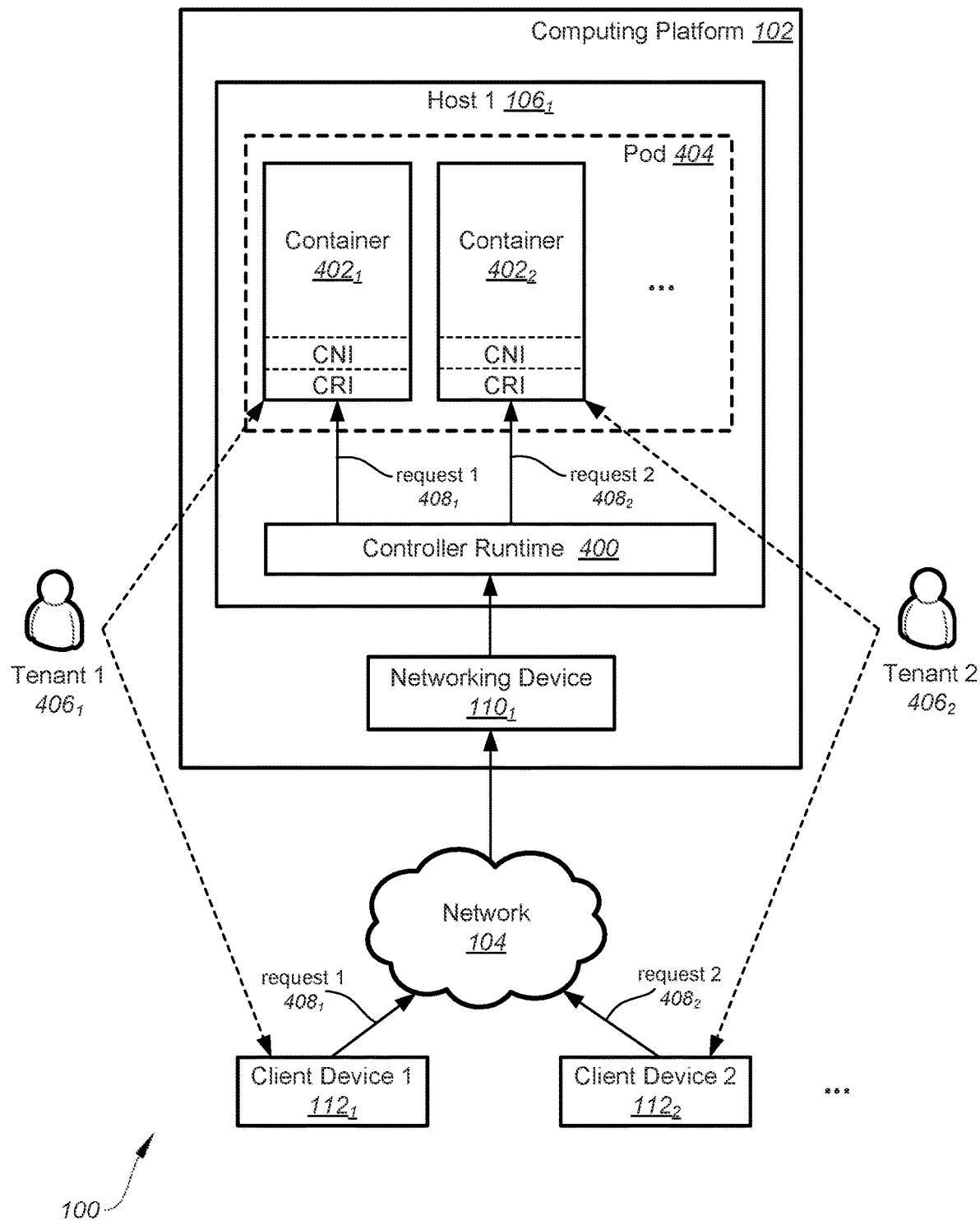
FIG. 4 is a simplified diagram the system for isolating applications associated with multiple tenants within the computing platform as shown in FIG. 1 according to one embodiment of the present invention.

FIG. 4 is a simplified diagram showing the system 100 for isolating applications associated with multiple tenants within the computing platform 102 according to one embodiment of the present invention. This diagram is merely an example, which should not unduly limit the scope of the claims. One of ordinary skill in the art would recognize many variations, alternatives, and modifications. In some examples, the host $106_1$ includes a controller runtime component 400. In certain examples, the controller runtime component 400 is configured to manage running the containers $402_1$ and $402_2$. For example, the containers $402_1$ and $402_2$ are associated with the pod 404 running on the host $106_1$. As an example, each of the containers $402_1$ and $402_2$ includes a container network interface (CNI) and a container runtime interface (CRI). In some examples, the container $402_1$ and the client device $112_1$ are associated with tenant $406_1$. In certain examples, the container $402_2$ and the client device $112_2$ are associated with tenant $406_2$.

In some embodiments, the container network interfaces of the containers $402_1$ and $402_2$ are configured to set up the host-level network layer of the host $106_1$. In some examples, the container network interfaces of the containers $402_1$ and $402_2$ are configured to generate network interfaces for launching the containers $402_1$ and $402_2$ on the host $106_1$ by assigning network addresses to the network interfaces. In certain examples, the container network interfaces of the containers $402_1$ and $402_2$ are configured to generate the broadcast domains (e.g., the VLANs) for each container that map to the unique tenant identification number associated with the containers, respectively. For example, the container network interface of the container $402_1$ is configured to generate the broadcast domain (e.g., the VLAN) for the container $402_1$ that maps to the unique tenant identification number (e.g., "1") associated with the container $402_1$. As an example, the unique tenant identification number (e.g., "1") associated with the container $402_1$ corresponds to tenant $406_1$. In another example, the container network interface of the container $402_2$ is configured to generate the broadcast domain (e.g., the VLAN) for the container $402_2$ that maps to the unique tenant identification number (e.g., "2") associated with the container $402_2$. As an example, the unique tenant identification number (e.g., "2") associated with the container $402_2$ corresponds to tenant $406_2$. In some examples, each controller network interface of the container $402_1$ and $402_2$ is configured to set up a virtual interface of the host $106_1$ for the pod 404 running on the host $106_1$.

In certain embodiments, the controller network interfaces of containers are configured to set up a pod-specific network for the corresponding pod at runtime of the pod. For example, the pod running on a host maps to the network address of the host. As an example, the controller network interfaces are configured to set up each pod network with the corresponding VLAN. In some examples, controller network interfaces are configured to use annotations to the network addresses associated with the corresponding pod to map a virtual ethernet interface to the corresponding VLANs. In certain examples, the controller network interface is configured to generate an interface list, IP configurations assigned to the interface, IPv6 addresses, and an internal domain name system.

According to some embodiments, the controller runtime component 400 is configured to receive the requests $408_1$ and $408_2$ from the client devices $112_1$ and $112_2$, respectively. For example, the controller runtime component 400 is configured to receive the requests $408_1$ and $408_2$ via an API server of the computing platform 102. In some examples, the API server delegates authentication and authorization of received client requests to an authentication and authorization component of the computing platform 102 for evaluating the client requests and access requirements and for granting access of the clients associated with the client requests to applications running on hosts of the computing platform 102.

According to certain embodiments, the container runtime component 400 is configured to send the requests $408_1$ and $408_2$ to the containers $402_1$ and $402_2$ based at least in part on the unique tenant identification number associated with each request, respectively. For example, the container runtime component 400 is configured to send the request $408_1$ to the containers $402_1$ based at least in part on the unique tenant identification number (e.g., "1") associated with the request $408_1$. As an example, the container runtime component 400 is configured to send the request $408_2$ to the containers $402_2$ based at least in part on the unique tenant identification number (e.g., "2") associated with the request $408_2$.

In some embodiments, the container runtime component 400 is configured to send the requests $408_1$ and $408_2$ to the containers $402_1$ and $402_2$ based at least in part on the network address associated with each request, respectively. For example, each network address associated with the requests $408_1$ and $408_2$ includes the corresponding unique tenant identification number associated with the client devices $112_1$ and $112_2$, respectively. As an example, the network address associated with the request $408_1$ includes the unique tenant identification number (e.g., "1") that is associated with the client devices $112_1$ and relates to tenant $406_1$. In another example, the network address associated with the request $408_2$ includes the unique tenant identification number (e.g., "2") that is associated with the client devices $112_2$ and relates to tenant $406_2$. In other examples, the container runtime component 400 is configured to isolate client requests from each other based at least in part on the tenants associated with each client request. For example, the container runtime component 400 is configured to extract the unique tenant identification number from the network address associated with a received client request and forward the client request to the container associated with the extracted unique tenant identification number.

Figure 5:
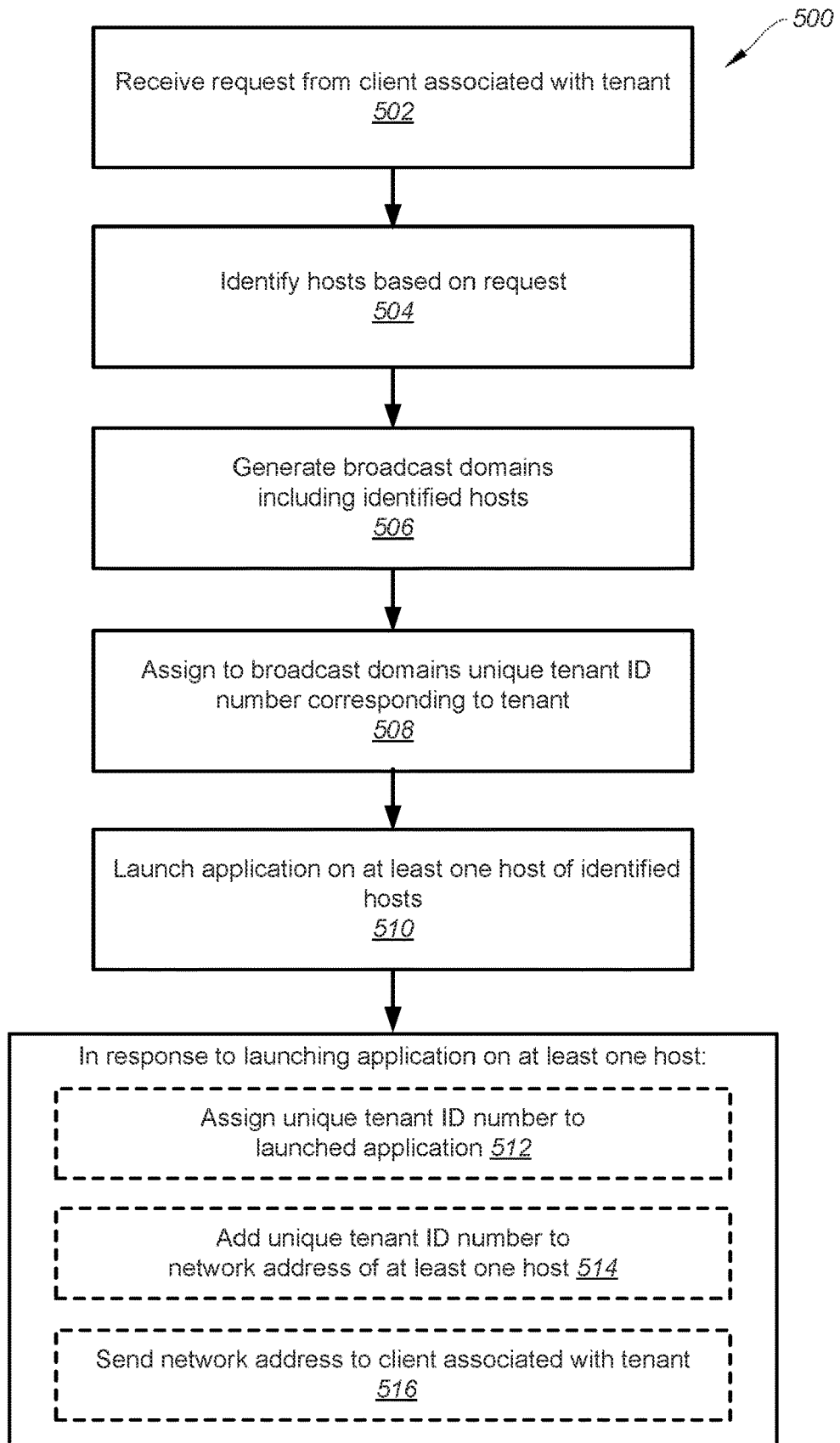
FIG. 5 is a simplified diagram showing a method for isolating applications associated with multiple tenants within a computing platform according to one embodiment of the present invention.

FIG. 5 is a simplified diagram showing a method for isolating applications associated with multiple tenants within a computing platform according to one embodiment of the present invention. This diagram is merely an example, which should not unduly limit the scope of the claims. One of ordinary skill in the art would recognize many variations, alternatives, and modifications. The method 500 includes processes 502-516 that are performed using one or more processors. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some embodiments, some or all processes (e.g., steps) of the method 500 are performed by the system 100. In certain examples, some or all processes (e.g., steps) of the method 500 are performed by a computer and/or a processor directed by a code. For example, a computer includes a server computer and/or a client computer (e.g., a personal computer). In some examples, some or all processes (e.g., steps) of the method 500 are performed according to instructions included by a non-transitory computer-readable medium (e.g., in a computer program product, such as a computer-readable flash drive). For example, a non-transitory computer-readable medium is readable by a computer including a server computer and/or a client computer (e.g., a personal computer, and/or a server rack). As an example, instructions included by a non-transitory computer-readable medium are executed by a processor including a processor of a server computer and/or a processor of a client computer (e.g., a personal computer, and/or server rack).

In some embodiments, at the process 502, a request is received from a client for running an application on a computing platform. The client is associated with a tenant of the computing platform. The computing platform includes a plurality of hosts connected through a network. Each host is associated with a network address and configured to run applications associated with multiple tenants. At the process 504, one or more hosts of the plurality of hosts are identified based at least in part on the request. At process 506, one or more broadcast domains including the identified one or more hosts are generated. The one or more broadcast domains are isolated in the network at the data link layer. At the process 508, the one or more broadcast domains are assigned a unique tenant identification number corresponding to the tenant. At the process 510, the application is launched on at least one host of the identified one or more hosts. At the process 512, in response to launching the application on the at least one host, the unique tenant identification number is assigned to the launched application. At the process 514, the unique tenant identification number is added to the network address of the at least one host. At the process 516, the network address of the at least one host is sent to the client associated with the tenant.

Figure 6:
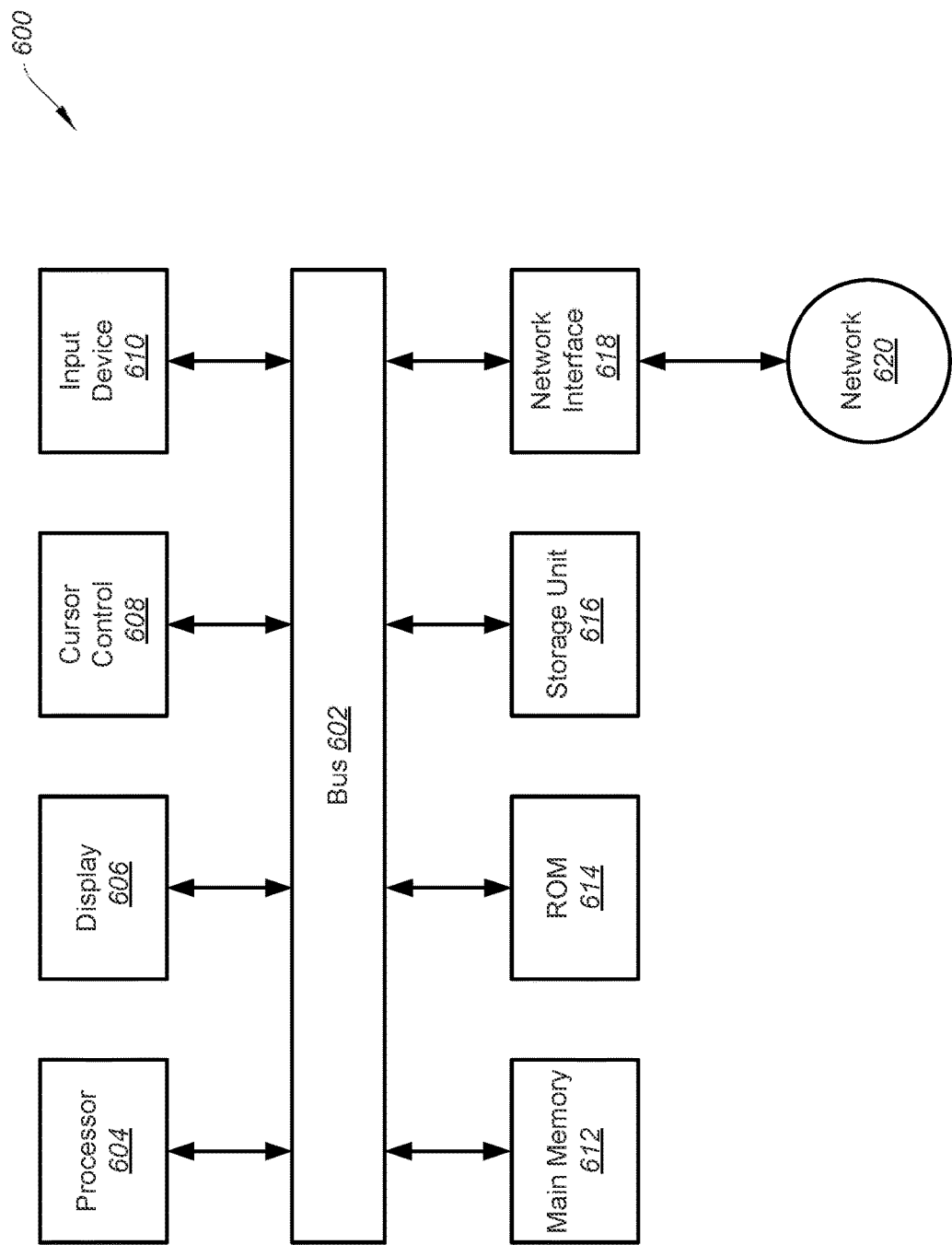
FIG. 6 is a simplified diagram showing a computing system for implementing a system for isolating applications associated with multiple tenants within a computing platform according to one embodiment of the present invention.

FIG. 6 is a simplified diagram showing a computing system for implementing a system for isolating applications associated with multiple tenants within a computing platform according to one embodiment of the present invention. This diagram is merely an example, which should not unduly limit the scope of the claims. One of ordinary skill in the art would recognize many variations, alternatives, and modifications. The computing system 600 includes a bus 602 or other communication mechanism for communicating information, a processor 604, a display 606, a cursor control component 608, an input device 610, a main memory 612, a read only memory (ROM) 614, a storage unit 616, and a network interface 618. In some embodiments, some or all processes (e.g., steps) of the method 500 are performed by the computing system 600. In some examples, the bus 602 is coupled to the processor 604, the display 606, the cursor control component 606, the input device 610, the main memory 612, the read only memory (ROM) 614, the storage unit 616, and/or the network interface 618. In certain examples, the network interface is coupled to a network 620. For example, the processor 604 includes one or more general purpose microprocessors. In some examples, the main memory 612 (e.g., random access memory (RAM), cache and/or other dynamic storage devices) is configured to store information and instructions to be executed by the processor 604. In certain examples, the main memory 612 is configured to store temporary variables or other intermediate information during execution of instructions to be executed by processor 604. For examples, the instructions, when stored in the storage unit 616 accessible to processor 604, render the computing system 600 into a special-purpose machine that is customized to perform the operations specified in the instructions. In some examples, the ROM 614 is configured to store static information and instructions for the processor 604. In certain examples, the storage unit 616 (e.g., a magnetic disk, optical disk, or flash drive) is configured to store information and instructions.

In some embodiments, the display 606 (e.g., a cathode ray tube (CRT), an LCD display, or a touch screen) is configured to display information to a user of the computing system 600. In some examples, the input device 610 (e.g., alphanumeric and other keys) is configured to communicate information and commands to the processor 604. For example, the cursor control 608 (e.g., a mouse, a trackball, or cursor direction keys) is configured to communicate additional information and commands (e.g., to control cursor movements on the display 606) to the processor 604.

According to some embodiments, method for isolating applications associated with multiple tenants within a computing platform. For example, a method includes receiving a request from a client associated with a tenant for running an application on a computing platform. The computing platform includes a plurality of hosts connected through a network. Each host is associated with a network address and configured to run applications associated with multiple tenants. The method further includes identifying one or more hosts of the plurality of hosts based at least in part on the request. The method further includes generating one or more broadcast domains including the identified one or more hosts. The one or more broadcast domains are isolated in the network at a data link layer. The method further includes assigning to the one or more broadcast domains a unique tenant identification number corresponding to the tenant. The method further includes launching the application on at least one host of the identified one or more hosts. In response to launching the application on the at least one host: the unique tenant identification number is assigned to the launched application; the unique tenant identification number is added to the network address of the at least one host; and the network address of the at least one host is sent to the client associated with the tenant. The method is performed using one or more processors. For example, the method is implemented according to at least FIG. 1, FIG. 2, FIG. 3, FIG. 4 and/or FIG. 5.

In some examples, the network address further includes a unique cluster identification number. The unique cluster identification number is associated with a cluster of the computing platform. The cluster is associated with the tenant. In certain examples, the unique tenant identification number includes the unique cluster identification number. In other examples, the network address includes a plurality of bit sequences. One bit sequence of the plurality of bit sequences includes the unique tenant identification number.

In certain examples, the plurality of bit sequences of the network address includes at least 128 bits. In some examples, the broadcast domains include virtual local area networks. In certain examples, the launched application is included in a container. The container is associated with the unique tenant identification number. For example, the container is included in a pod running on the at least one host. The pod includes one or more containers. Each container of the one or more containers is associated with one tenant of the computing platform. As an example, each container of the one or more containers is associated with a different tenant of the computing platform. In one example, the pod maps to the network address. In some examples, the network address further includes a region identification number, a network device identification number, or a virtual interface of the at least one host. In certain examples, the one or more broadcast domain map to the network address.

According to certain embodiments, a system for isolating applications associated with multiple tenants within a computing platform includes a plurality of hosts connected through a network and a fleet controller. Each host is associated with a network address and configured to run applications associated with multiple tenants on a computing platform. The fleet controller is configured to, in response to receiving a first request from a client associated with a tenant for running an application on the computing platform, identify one or more hosts of the plurality of hosts based at least in part on the request. The fleet controller is further configured to generate one or more broadcast domains including the identified one or more hosts. The one or more broadcast domains are isolated in the network at a data link layer. The fleet controller is further configured to assign to the one or more broadcast domains a unique tenant identification number corresponding to the tenant. The fleet controller is further configured to send a second request to a scheduler for launching the application on at least one host of the identified one or more hosts. The fleet controller is further configured to, in response to receiving confirmation from the scheduler of the application being launched on the at least one host: assign the unique tenant identification number to the launched application; add the unique tenant identification number to the network address of the at least one host; and send the network address of the at least one host to the client associated with the tenant. For example, the system is implemented according to at least FIG. 1, FIG. 2, FIG. 3, and/or FIG. 4.

In some examples, the network address further includes a unique cluster identification number. The unique cluster identification number is associated with a cluster of the computing platform. The cluster is associated with the tenant. In certain examples, the network address includes a plurality of bit sequences. One bit sequence of the plurality of bit sequences includes the unique tenant identification number. In other examples, the plurality of bit sequences of the network address includes at least 128 bits. In some examples, the broadcast domains include virtual local area networks.

According to some embodiments, a system for isolating applications associated with multiple tenants within a computing platform includes a client associated with a tenant and configured to request running an application on a computing platform. The computing platform includes a plurality of hosts connected through a network. Each host is associated with a network address and is configured to run applications associated with multiple tenants. The client is further configured to send a request for running the application on the computing platform. The client is further configured to, in response to sending the request for running the application on the computing platform, receive the network address of at least one host of the plurality of hosts. One or more hosts of the plurality of hosts are identified based at least in part on the request. The identified one or more hosts include the at least one host. One or more broadcast domains are generated to include the identified one or more hosts. The one or more broadcast domains are isolated in the network at a data link layer. The one or more broadcast domains are assigned to a unique tenant identification number corresponding to the tenant. The application is launched on the at least one host of the identified one or more hosts. The launched application is assigned to the unique tenant identification number. The unique tenant identification number is added to the network address of the at least one host. For example, the system is implemented according to at least FIG. 1, FIG. 2, FIG. 3, and/or FIG. 4.

In some examples, the network address further includes a unique cluster identification number. The unique cluster identification number is associated with a cluster of the computing platform. The cluster is associated with the tenant. In certain examples, the network address includes a plurality of bit sequences. One bit sequence of the plurality of bit sequences includes the unique tenant identification number.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, while the embodiments described above refer to particular features, the scope of the present invention also includes embodiments having different combinations of features and embodiments that do not include all of the described features. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for isolating applications associated with multiple tenants within a computing platform, the method comprising:
   receiving a request from a client associated with a tenant for running an application on a computing platform, the computing platform including a plurality of hosts connected through a network, each host of the plurality of hosts being associated with a network address;
   generating one or more broadcast domains based at least in part on the request, the one or more broadcast domains being isolated in the network at a data link layer;
   assigning a unique tenant identification number to the application; and
   adding the unique tenant identification number to the network address of at least one host of the plurality of hosts;
   wherein the method is performed using one or more processors.

2. The method of claim 1, wherein the request is received by a fleet controller, and wherein the fleet controller sends the received request to a fleet catalog for storing.

3. The method of claim 2, further comprising:
   receiving a state of a resource in the fleet catalog, wherein the state of the resource includes an assignment of a host of the plurality of hosts and a status of the host; and
   updating the state of the resource in the fleet catalog.

4. The method of claim 1 wherein:
   the network address includes a plurality of bit sequences; and
   a bit sequence of the plurality of bit sequences includes the unique tenant identification number.

5. The method of claim 4, wherein the bit sequence includes a 20-bit sequence or a 32-bit sequence for embedding the unique tenant identification number in the network address.

6. The method of claim 5 wherein the plurality of bit sequences of the network address includes at least 128 bits.

7. The method of claim 1 wherein the one or more broadcast domains include one or more virtual local area networks.

8. The method of claim 1 wherein:
   the application is included in a container; and
   the container is associated with the unique tenant identification number.

9. The method of claim 8 wherein:
   the container is included in a pod running on the at least one host;
   the pod includes one or more containers; and
   each container of the one or more containers is associated with a respective tenant of the computing platform.

10. The method of claim 1 wherein the network address further includes at least one in a group consisting of a region identification number, a network device identification number, and a virtual interface of the at least one host.

11. The method of claim 1, further comprising mapping the one or more broadcast domains to the network address.

12. The method of claim 11, wherein the one or more broadcast domain are mapped to the network address via information of a certificate.

13. A system for isolating applications associated with multiple tenants within a computing platform, the system comprising:
   a plurality of hosts connected through a network, each host of the plurality of hosts being associated with a network address; and
   a fleet controller;
   wherein the fleet controller is configured to:
      receive a request from a client associated with a tenant for running an application on the computing platform;
      generate one or more broadcast domains based at least in part on the request, the one or more broadcast domains being isolated in the network at a data link layer;
      assign a unique tenant identification number to the application; and
      add the unique tenant identification number to the network address of at least one host of the plurality of hosts.

14. The system of claim 13, further comprising a fleet catalog, wherein the fleet controller is further configured to store information associated with the one or more broadcast domains in the fleet catalog.

15. The system of claim 14, wherein the fleet controller is further configured to record a state change of the at least one host in the fleet catalog.

16. The system of claim 13, further comprising a fleet scheduler, wherein the fleet scheduler is configured to identify one or more hosts of the hosts based at least in part on the request, and wherein the at least one host is at least one host of the one or more identified hosts.

17. The system of claim 13 wherein the one or more broadcast domains include one or more virtual local area networks.

18. A system for isolating applications associated with multiple tenants within a computing platform, the system comprising:
   a client associated with a tenant and configured to request running an application on a computing platform, the computing platform including a plurality of hosts connected through a network, each host of the plurality of hosts being associated with a network address;
   wherein the client is further configured to:
   send a request for running the application on the computing platform, wherein:
      one or more broadcast domains are generated based at least in part on the request, the one or more broadcast domains being isolated in the network at a data link layer;
      the application is assigned to a unique tenant identification number; and
      the unique tenant identification number is added to a network address of at least one host of the plurality of hosts.

19. The system of claim 18 wherein:
   the network address further includes a unique cluster identification number;
   the unique cluster identification number is associated with a cluster of the computing platform; and
   the cluster is associated with the tenant.

20. The system of claim 19 wherein:
the network address includes a plurality of bit sequences; and
one bit sequence of the plurality of bit sequences includes the unique tenant identification number.

* * * * *